(12) United States Patent
Bangalore et al.

(10) Patent No.: US 8,571,849 B2
(45) Date of Patent: Oct. 29, 2013

(54) SYSTEM AND METHOD FOR ENRICHING SPOKEN LANGUAGE TRANSLATION WITH PROSODIC INFORMATION

(75) Inventors: Srinivas Bangalore, Morristown, NJ (US); Vivek Kumar Rangarajan Sridhar, Goleta, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 754 days.

(21) Appl. No.: 12/241,660

(22) Filed: Sep. 30, 2008

(65) Prior Publication Data

US 2010/0082326 A1    Apr. 1, 2010

(51) Int. Cl.
*G06F 17/28* (2006.01)
(52) U.S. Cl.
USPC ...... 704/3; 704/10; 704/2; 704/200; 704/231; 704/235; 704/251; 704/252; 704/258; 704/260; 704/266; 704/270.1; 704/275; 704/277; 709/250
(58) Field of Classification Search
USPC ............... 704/258, 251, 2, 10, 200, 231, 235, 704/252, 260, 266, 270.1, 275, 277, 3; 709/250
See application file for complete search history.

(56) References Cited

U.S. PATENT DOCUMENTS

| | | | | |
|---|---|---|---|---|
| 5,623,609 A * | 4/1997 | Kaye et al. | | 704/1 |
| 5,717,828 A * | 2/1998 | Rothenberg | | 704/251 |
| 5,857,170 A * | 1/1999 | Kondo | | 704/266 |
| 6,115,686 A * | 9/2000 | Chung et al. | | 704/260 |
| 6,195,634 B1 * | 2/2001 | Dudemaine et al. | | 704/231 |
| 6,249,763 B1 * | 6/2001 | Minematsu | | 704/252 |
| 6,292,769 B1 * | 9/2001 | Flanagan et al. | | 704/3 |
| 6,345,245 B1 * | 2/2002 | Sugiyama et al. | | 704/10 |
| 6,859,778 B1 * | 2/2005 | Bakis et al. | | 704/277 |
| 6,865,533 B2 * | 3/2005 | Addison et al. | | 704/260 |
| 7,016,849 B2 * | 3/2006 | Arnold et al. | | 704/275 |
| 7,058,578 B2 * | 6/2006 | Michelson et al. | | 704/270.1 |
| 7,827,034 B1 * | 11/2010 | Munns | | 704/275 |
| 8,195,457 B1 * | 6/2012 | Lagassey | | 704/235 |
| 2002/0111794 A1 * | 8/2002 | Yamamoto et al. | | 704/200 |
| 2002/0120451 A1 * | 8/2002 | Kato et al. | | 704/258 |
| 2003/0069997 A1 * | 4/2003 | Bravin et al. | | 709/250 |
| 2003/0191639 A1 * | 10/2003 | Mazza | | 704/231 |
| 2004/0064322 A1 * | 4/2004 | Georgiopoulos et al. | | 704/277 |
| 2004/0073423 A1 * | 4/2004 | Freedman | | 704/235 |
| 2004/0267527 A1 * | 12/2004 | Creamer et al. | | 704/235 |
| 2005/0114131 A1 * | 5/2005 | Stoimenov et al. | | 704/251 |
| 2006/0069567 A1 * | 3/2006 | Tischer et al. | | 704/260 |
| 2008/0243474 A1 * | 10/2008 | Furihata et al. | | 704/2 |
| 2009/0089058 A1 * | 4/2009 | Bellegarda | | 704/251 |

* cited by examiner

*Primary Examiner* — Michael Colucci (57) ABSTRACT

Disclosed herein are systems, methods, and computer readable-media for enriching spoken language translation with prosodic information in a statistical speech translation framework. The method includes receiving speech for translation to a target language, generating pitch accent labels representing segments of the received speech which are prosodically prominent, and injecting pitch accent labels with word tokens within the translation engine to create enriched target language output text. A further step may be added of synthesizing speech in the target language based on the prosody enriched target language output text. An automatic prosody labeler can generate pitch accent labels. An automatic prosody labeler can exploit lexical, syntactic, and prosodic information of the speech. A maximum entropy model may be used to determine which segments of the speech are prosodically prominent. A pitch accent label can include an indication of certainty that a respective segment of the speech is prosodically prominent and/or an indication of prosodic prominence of a respective segment of speech.

17 Claims, 5 Drawing Sheets

SYSTEM AND METHOD FOR ENRICHING SPOKEN LANGUAGE TRANSLATION WITH PROSODIC INFORMATION

BACKGROUND OF THE INVENTION

1. Field of the Invention

The present invention relates to speech and audio processing and more specifically to spoken language translation.

2. Introduction

Current speech-to-speech translation approaches predominantly rely on a pipeline model consisting of several black box steps. Some sample applications of speech-to-speech translation are a mobile device in to which a user speaks in one language, such as English, and the speech is translated into another spoken language, such as Korean. The first step of the traditional speech-to-speech translation approach is to transcribe the source language speech into text using a speech recognizer. Typically, the top-best ASR hypothesis text is considered for machine translation. The second step is to translate the text via machine. The third step after translation is to synthesize the text into speech in the target language. Such an approach discards the rich information contained in the source speech signal that may be vital for meaningful communication. It is well known that prosodic and affective aspects of speech are highly correlated with the communicative intents of the speaker and often complement the information present in the lexical stream. Disregarding such information often results in ambiguous concept transfer in translation, which is a significant problem in the art. For example, even the best of current speech translation approaches may provide improper utterance chunking, erroneously emphasizing a word or phrase in the target language. In other cases, key contextual information such as word prominence, emphasis, and contrast can be lost in the speech-to-text conversion.

Prosodic information has been used in speech translation but mainly for utterance segmentation and disambiguation. The VERBMOBIL speech-to-speech translation system utilizes prosody through use of clause boundaries, accentuation and sentence mood for improving the linguistic analysis within the speech understanding component. The use of clause boundaries improves the decoding speed and disambiguation during translation. More recently P. D. Aguero, J. Adell, and A. Bonafonte have proposed a framework for generating target language intonation as a function of source utterance intonation. They use an unsupervised algorithm to find intonation clusters in the source speech similar to target speech. However, such a scheme assumes some notion of prosodic isomorphism either at word or accent group level.

Accordingly, what is needed in the art is an improved way to preserve and use the prosodic information throughout the process of speech-to-speech translation.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer readable-media for enriching spoken language translation with prosodic information in a statistical speech translation framework. The method includes receiving speech for translation to a target language, generating pitch accent labels representing segments of the received speech which are prosodically prominent, and injecting pitch accent labels with word tokens within the translation engine to create enriched target language output text. A further step may be added of synthesizing speech in the target language based on the prosody enriched target language output text. An automatic prosody labeler can generate pitch accent labels. An automatic prosody labeler can exploit lexical, syntactic, and prosodic information of the speech. A maximum entropy model may be used to determine which segments of the speech are prosodically prominent. A pitch accent label can include an indication of certainty that a respective segment of the speech is prosodically prominent and/or an indication of prosodic prominence of a respective segment of speech.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
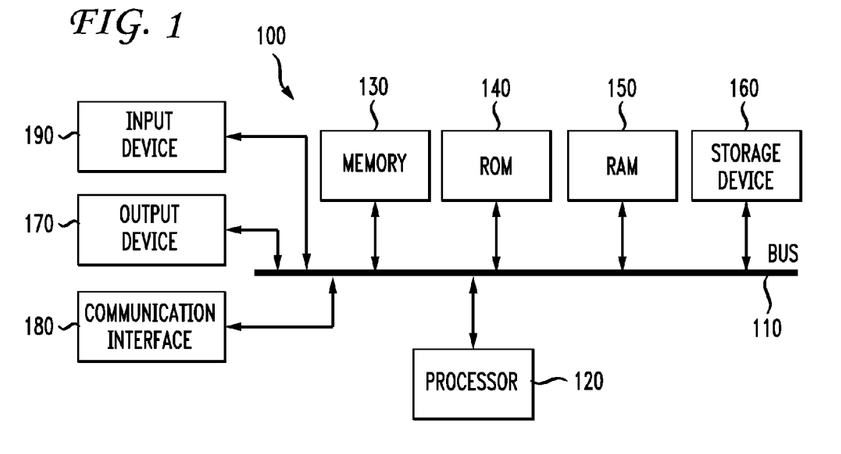
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software.

Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
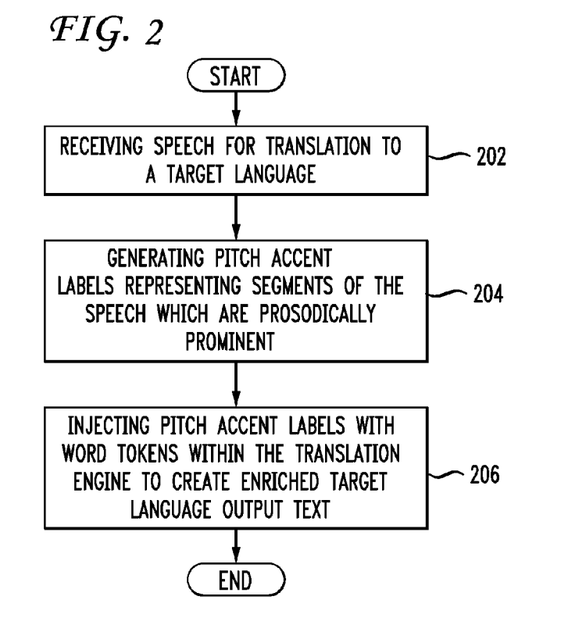
FIG. 2 illustrates an example method embodiment.

FIG. 2 illustrates an example method embodiment for enriching spoken language translation with prosodic information in a statistical speech translation framework. The method includes receiving speech for translation to a target language (202) and generating categorical pitch accent labels representing segments of the received speech which are prosodically prominent (204). The system can use a discriminative classifier model (such as a maximum entropy model) to determine which segments of the speech are prosodically prominent. Sample equations are provided showing how prominence labeling can be accomplished through the use of a maximum entropy model. Given a sequence of words $\omega_i$ in an utterance $W=\{\Omega_1, \ldots, \omega_n\}$, the corresponding syntactic information sequence $S=\{s_1, \ldots, s_n\}$ (for parts-of-speech, syntactic parsing, etc.), a set of acoustic-prosodic features $A=\{a_1, \ldots, a_n\}$, where $a_i=(a_i^1, \ldots a_i^{t_{\omega i}})$ is the acoustic-prosodic feature vector corresponding to word $\omega_i$ with a frame length of $t_{\omega_i}$ and a prosodic label vocabulary ($l_i \in L$, $|L|=V$), the best prosodic label sequence $l_1, l_2, \ldots, l_n$ is obtained by approximating the sequence classification problem, using conditional independence assumptions, to a product of local classification problems as shown in Equation 2. Prosodic labels are assigned to each word using the classifier conditioned on a vector of local contextual features such as the lexical, syntactic and acoustic information.

$$L* = \operatorname*{argmax}_{L} P(L|W, S, A) \qquad \text{Equation 1}$$

$$L* \approx \operatorname*{argmax}_{L} \prod_{i=1}^{n} p(l_i | \omega_{i-k}^{i+k}, s_{i-k}^{i+k}, a_{i-k}^{i+k}) \qquad \text{Equation 2}$$

$$L* = \operatorname*{argmax}_{L} \prod_{i=1}^{n} p(l_i | \Phi(W, S, A, i)) \qquad \text{Equation 3}$$

where $\Phi(W, S, A, i)=(\omega_{i-k}^{i+k}, s_{i-k}^{i+k}, a_{i-k}^{i+k})$ is a set of features extracted within a bounded local context k. Lexical features can include word trigrams. Syntactic features can include trigrams of part-of-speech tags and/or supertags. Acoustic-prosodic features can include the f0 and energy values normalized over utterance and extracted over 10 ms frames or over frames of any other suitable duration. A machine learning toolkit, such as LLAMA, can be used to estimate the conditional distribution $p(l_i|\Phi)$ using maximum entropy modeling.

An automatic prosody labeler can be used to generate categorical pitch accent labels. The automatic prosody labeler can exploit lexical, syntactic, and prosodic information of the source speech. Rather than guessing prosody information after the speech is converted to text and translated, the automatic prosody labeler can take lexical, syntactic, and prosodic information as input and preserve that information by means of prosody enriched text. The prosody enriched text can be used to generate more prosodically accurate translated speech. A pitch accent label can include an indication of certainty that a respective segment of the speech is prosodically prominent. A pitch accent label can also include an indication of prosodic prominence of a respective segment of speech.

The method further includes injecting pitch accent labels with word tokens within the translation engine to create enriched target language output text (206). In an additional step, the method may also include synthesizing speech in the target language based on the prosody enriched target language output text. This last step is optional, as the text may be stored for future retrieval, for comparison purposes, etc. While it is anticipated that many embodiments of this method, especially real-time embodiments, may contain the last step of synthesizing the prosody enriched output language into speech, it is not strictly required as a core part of the method.

A classifier used for automatic prominence detection can be trained on a corpus such as hand-labeled conversational speech. Prominent syllables can be marked with "*" to indicate a pitch accent (tonally cued prominence) or "*?" to indicate a possible prominence or uncertainty about presence of a pitch accent. The pitch accent labels on syllables can be mapped to words for training a word-level pitch accent classifier with two classes, accent and none.

In one embodiment, levels or degrees of prominence are included along with the pitch accent label. "*1" indicates a weak prominence, "*4" indicates a medium prominence, and "*10" indicates a strong prominence. Prosodic prominence can also include an indication of accent in the original speech to influence the translated speech. For instance, if the original English speech has a New York accent, a translation system creates a low level and/or a high level regional accent label to influence the translated output speech. An example pitch accent label can include "*NY3", indicating a level 3 prominence and a New York accent. Translated output speech in Spanish can contain the same type of New York accent as the input English speech. The system can allow a user to establish preferences governing when, where, and how much of the accent to apply during translation.

In another embodiment, the system keeps track of further details of the original speech to influence the translated output speech. Some such details include the rate of speech, word order, length of pauses, loudness, timbre, pitch, etc. These details of the original speech can be incorporated wholly or partially into the translated output speech, based on an automatic determination of what is appropriate in the output language, speaker preferences, and/or other factors.

Figure 3A:
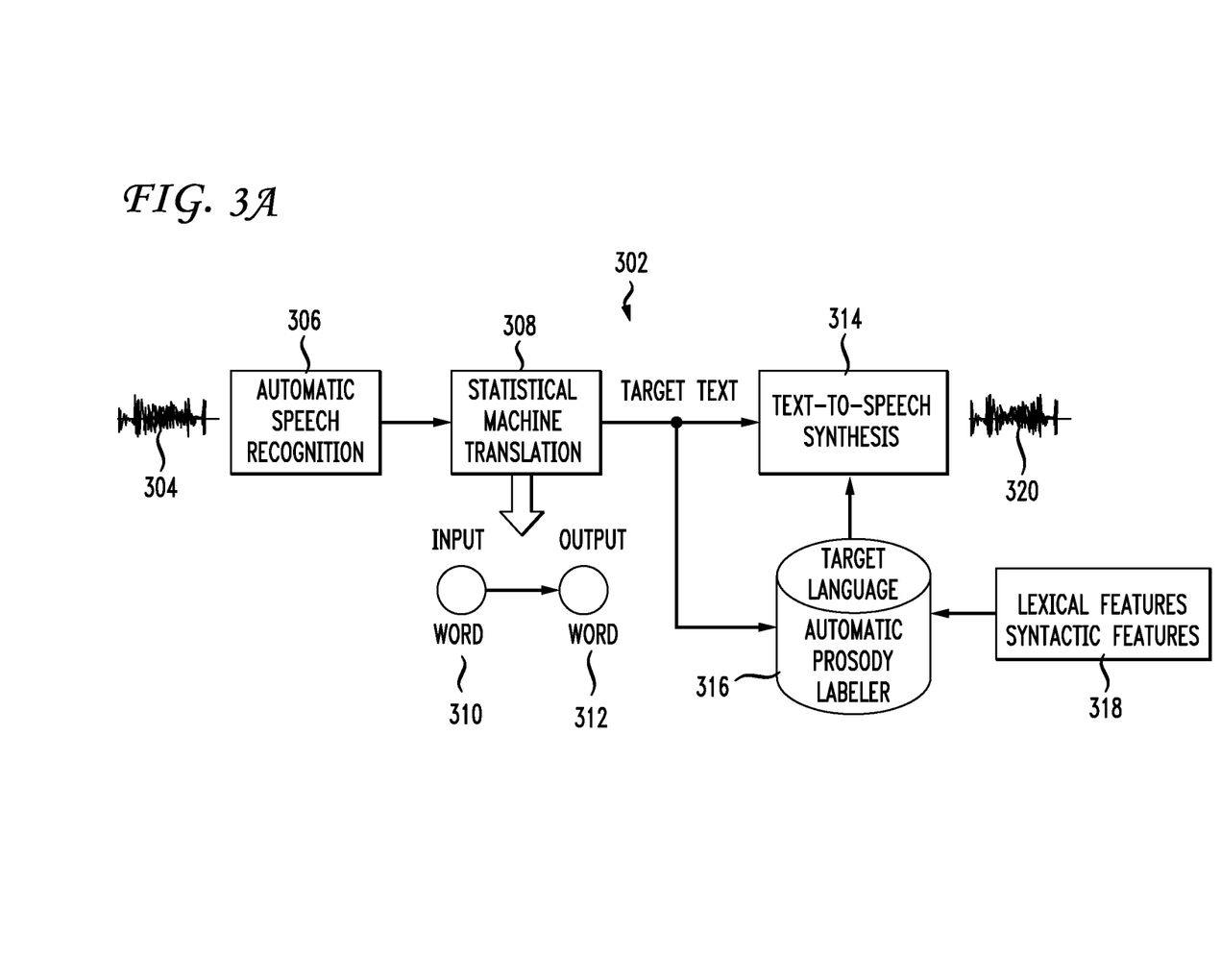
FIG. 3A illustrates a conventional speech-to-speech translation method.
Figure 3B:
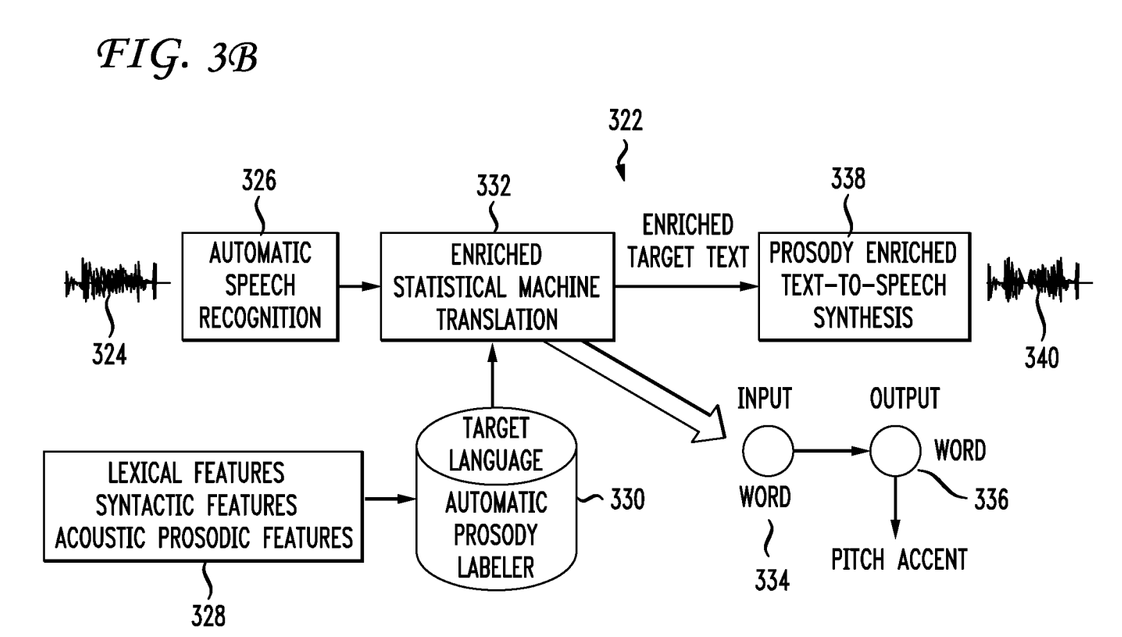
FIG. 3B illustrates a prosody enriched speech-to-speech translation method.

FIGS. 3A and 3B are provided to illustrate the fundamental differences between conventional approaches and the approach described herein. FIG. 3A illustrates a conventional prior art speech-to-speech translation method and FIG. 3B illustrates a prosody enriched speech-to-speech translation method. The conventional approach 302 which is known in the art accepts speech 304 in an automatic speech recognition module 306. This approach converts speech to text and passes the text to a statistical machine translation module 308. This module translates input words 310 or phrases to output words 312 or phrases. The translation is performed on bare text and can only glean information about the speech based on the text itself. The approach sends the target text to a text-to-speech synthesis module 314 and a target language automatic prosody labeler 316 after translating all the input text to output text. The labeler examines lexical features and syntactic features 318 of the target language to guess or hypothesize appropriate prosody features. The labeler 316 sends prosody labels to the text-to-speech synthesis module 314 which incorporates the prosody labels into synthesized speech 320 in the target language.

In contrast, the approach described herein 322 generates enriched tokens on the target side. Where the conventional approach 302 predicts prosody from the output of the statistical machine translation using just hypothesized text and syntax, the approach described herein 322 integrates the assignment of prosodic prominence to word tokens within the translation engine. Hence, the automatic prosody labeler 330 can exploit lexical, syntactic and prosodic information 328. Furthermore, the enriched target language output 336 can facilitate prosody enriched text-to-speech synthesis, the quality of which is typically preferred by human listeners. The approach described herein 322 accepts speech 324 in an automatic speech recognition module 326. The approach extracts lexical features, syntactic features, and acoustic-prosodic features 328 from the original speech 324 and feeds them into a target language automatic prosody labeler 330. This is different from the prior art conventional approach 302 because the prosody labeling information is acquired based on actual speech instead of hypothesized based on translated text. This approach converts speech to text and passes it to an enriched statistical machine translation module 332. The enriched statistical machine translation module generates enriched target text by combining prosody labels with text. The enriched target text is fed to a prosody enriched text-to-speech synthesis module 338. The prosody enriched text-to-speech synthesis module 338 takes input words 334 or phrases and combines pitch accent and other prosody information to generate output words 335 or phrases. The prosody enriched output words are converted to output speech 340. A markup language such as SGML or XML can depict enriched target text as well as a custom markup language.

$S_s$, $T_s$ and $S_t$, $T_t$ are the speech signals and equivalent textual transcription in the source and target language, and $L_t$ is the enriched representation, including prosody, for the target speech. Enriched speech-to-speech translation may be formalized in the following manner:

$$S_t^* = \arg\max P(S_t | S_s) \qquad \text{Equation 4}$$

$$P(S_t | S_s) = \sum_{T_t, T_s, L_t}^{S_t} P(S_t, T_t, T_s, L_t | S_s) \qquad \text{Equation 5}$$

$$\approx \sum_{T_t, T_s, L_t} P(S_t | T_t, L_t) \cdot P(T_t, L_t | T_s) \cdot P(T_s | S_s) \qquad \text{Equation 6}$$

where Equation 6 is obtained through conditional independence assumptions. Even though the recognition and translation can be performed jointly, typical speech-to-speech translation frameworks compartmentalize the ASR, MT, and TTS components so each can be optimized for performance individually.

$$\max_{S_t} P(S_t \mid S_s) \approx$$

Equation 7

$$\max_{S_t} P(S_t \mid T_t^*, L_t^*) \times \max_{T_t, L_t} P(T_t, L_t \mid T_s^*) \times \max_{T_s} P(T_s \mid S_s)$$

where $T_s^*$ is the output of speech recognition, $T_t^*$ and $L_t^*$ are the target text and enriched prosodic representation obtained from translation. While conventional approaches address the detection of $L_t^*$ separately through postprocessing, the prosody enriched approach described herein integrates this within the translation process thereby enabling the use of acoustic-prosodic information in training the translation engine. The rich annotations ($L_t$) can be syntactic or semantic concepts or pitch accent labels.

Figure 4:
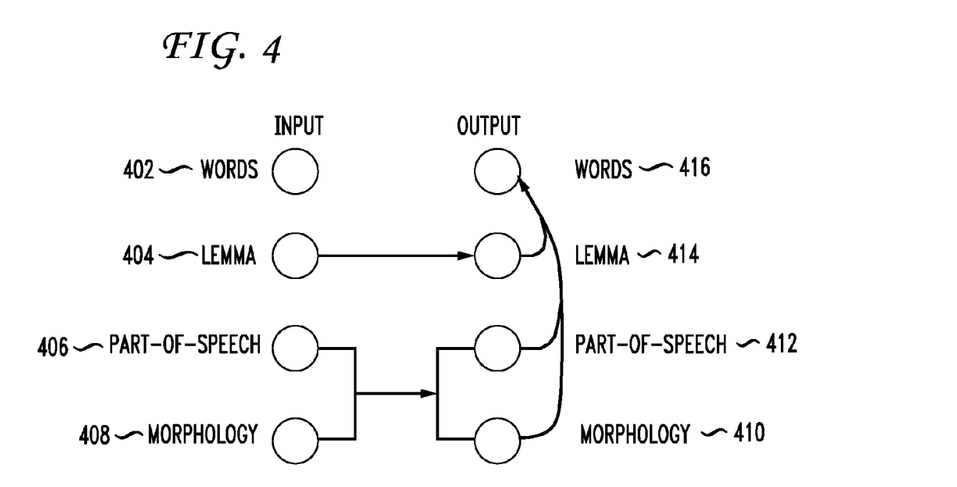
FIG. 4 illustrates a factored translation model.

FIG. 4 illustrates a factored translation model of input words 402 into output words 416. Factored translation models can integrate linguistic information such as part-of-speech 406, 412, morphology 408, 410 and shallow syntax in conventional phrase-based statistical translation. Such models allow for integrating multiple levels of information into the translation process instead of incorporating linguistic markers in either preprocessing or postprocessing. For example, in morphologically rich languages it may be preferable to translate lemma 404, 414 and morphological information 408, 410 separately and combine the information on the target side to generate the output surface words 416. The arcs on the right side of FIG. 4 represent conditional dependencies between the nodes.

Figure 5A:
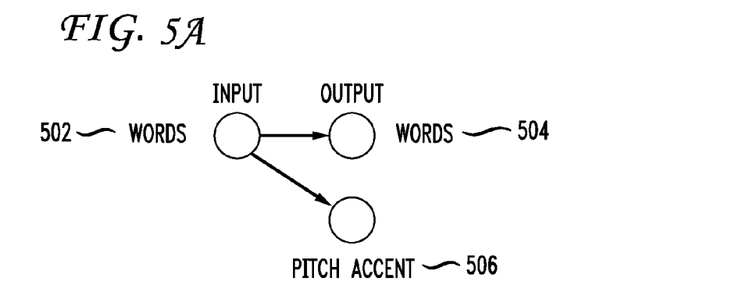
FIG. 5A illustrates a first factored model.
Figure 5B:
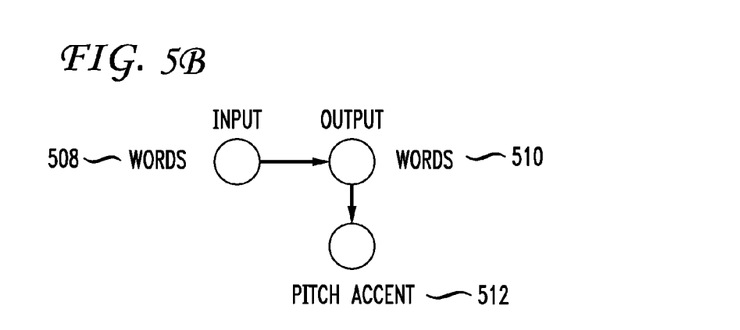
FIG. 5B illustrates a second factored model.

Factored translation models are primarily used to improve word level translation accuracy by incorporating the factors in phrase-based translation. In contrast, the principles described herein integrate factors such as pitch accent labels in speech translation for the purpose of maximizing the accuracy of the output factors themselves. By facilitating factored translation with pitch accent labels predicted from prosodic, syntactic and lexical cues, the enriched translation approach produces output speech with improved pitch accent assignment accuracy. On the other hand, hypothesizing prosodic prominence during or shortly before output in conventional speech translation systems is subject to greater error due to noisy translations and lack of direct acoustic-prosodic information. FIGS. 5A and 5B illustrate the types of factored models used in an enriched prosodic prominence approach.

FIG. 5A illustrates a first factored model, representing joint translation of words 502, 504 and prominence or pitch accent 506. Thus, the phrase translation table obtained for such a model would contain compound tokens (word+prominence) in the target language. However, with a factored approach the alignments can be built based on the words 502, 504 alone, thus avoiding data sparsity typically introduced by compound tokens. FIG. 5B illustrates a second factored model. This model translates input words 508 to output words 510 and generates prominence labels such as pitch accent 512 from the output word forms through a generation step.

Figure 6:
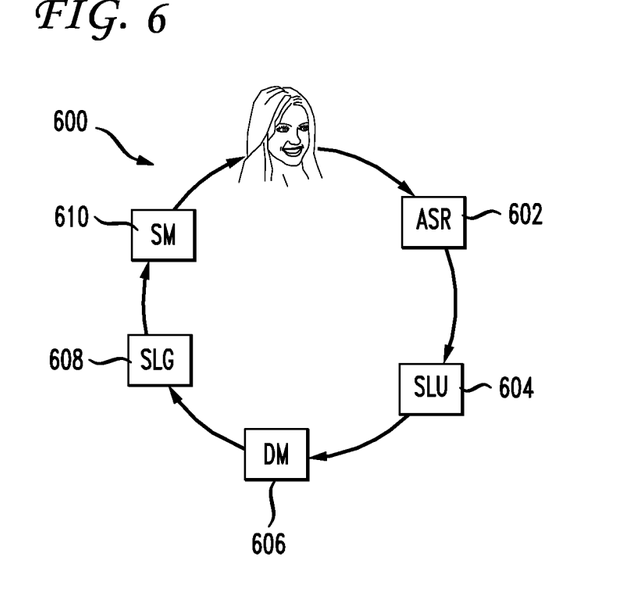
FIG. 6 illustrates a functional block diagram of an exemplary natural language spoken dialog system.

FIG. 6 illustrates a functional block diagram of an exemplary natural language spoken dialog system. The principles of enriched spoken language translation described herein can be implemented as a part of or operate in connection with a natural spoken language dialog system to provide, for example, real-time translation of speech in an automated natural speech interface via telephone. In this manner, a spoken dialog system which is tuned to pick up on and understand prosodically prominent segments of speech can still be effective with foreign languages processed through a translation module. Spoken dialog systems aim to identify intents of humans, expressed in natural language, and take actions accordingly, to satisfy their requests. Natural language spoken dialog system 600 can include an automatic speech recognition (ASR) module 602, a spoken language understanding (SLU) module 604, a dialog management (DM) module 606, a spoken language generation (SLG) module 608, and synthesizing module 610. The synthesizing module can be any type of speech output module. For example, it can be a module wherein one of a plurality of prerecorded speech segments is selected and played to a user. Thus, the synthesizing module represents any type of speech output. The present invention focuses on innovations related to the dialog management module 606 and can also relate to other components of the dialog system.

The ASR module 602 analyzes speech input and provides a textual transcription of the speech input as output. SLU module 604 can receive the transcribed input and can use a natural language understanding model to analyze the group of words that are included in the transcribed input to derive a meaning from the input. The role of DM module 606 is to interact in a natural way and help the user to achieve the task that the system is designed to support. DM module 606 receives the meaning of the speech input from SLU module 604 and determines an action, such as, for example, providing a response, based on the input. SLG module 608 generates a transcription of one or more words in response to the action provided by DM 606. The synthesizing module 610 receives the transcription as input and provides generated audible speech as output based on the transcribed speech.

Thus, the modules of system 600 recognize speech input, such as speech utterances, transcribe the speech input, identify (or understand) the meaning of the transcribed speech, determine an appropriate response to the speech input, generate text of the appropriate response and from that text, generate audible "speech" from system 600, which the user then hears. In this manner, the user can carry on a natural language dialog with system 600. Those of ordinary skill in the art will understand the programming languages and means for generating and training ASR module 602 or any of the other modules in the spoken dialog system. Further, the modules of system 600 can operate independent of a full dialog system. For example, a computing device such as a smartphone (or any processing device having a phone capability) can include an ASR module wherein a user says "call mom" and the smartphone acts on the instruction without a "spoken dialog."

A module for prosody-enriched speech to speech translation can be inserted at any point or points in the cycle or integrated with any of the modules shown in FIG. 6. For example, a prosody enriched speech to speech translation module can be inserted between the ASR 602 and the SLU 604 to generate pitch accent labels from the original speech. A companion injection module can be integrated with the SM 610 to incorporate the previously generated pitch accent labels into the translated speech. Other locations and configurations are possible.

One potential application of the principles described herein is a portable translation assistance and language teaching device. Such a device can take speech as input. The device can constantly listen in on a conversation or it can listen only when a user indicates. When speech is detected that is not in a desired target language, the device translates that speech into the target language. This can be useful, for example, where an American tourist in Peru who knows rudimentary Spanish can use the device to supplement her limited Spanish. She can speak in Spanish the words and phrases she knows, and the rest she can speak in English, knowing that the device can translate and speak those portions into Spanish. Alternately, the device can be used to train and teach the tourist. She can say a word or phrase in English and hear the translation in her own accent and with her own pitch accent labels applied. In this manner, she can hear a phrase and learn how to say it. Such a device may be portable for individual or small group use or may be larger for use in a more formal teaching environment. In some cases, the portable translation device has insufficient storage or processing power to accommodate the prosody-enriched speech-to-speech translation, but has a network connection such as EDGE, 802.11x, or 3G. In these cases, the portable translation device can transmit information to a remote server for processing and receive results from the remote server for generating the translated, prosody-enriched speech. One example of such a device is an Apple iPhone.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in portable translation devices, automated translation of media such as movies into foreign languages while retaining prosody information, or enhancing the effectiveness of automated speech interface systems. Those skilled in the art will readily recognize various modifications and changes that may be made to the present invention without following the example embodiments and applications illustrated and described herein, and without departing from the true spirit and scope of the present invention.

We claim:

1. A method comprising:
receiving speech for translation to a target language;
prior to a translation of the speech, generating, via a processor and via a discriminative classifier model, a pitch accent label based on the speech independent of volume, the pitch accent label having a regional accent type and representing segments of the speech which are prosodically prominent; and
injecting the pitch accent label with a word token within a translation engine to create target language output text.

2. The method of claim 1, further comprising synthesizing speech in the target language based on the target language output text.

3. The method of claim 1, wherein an automatic prosody labeler generates the pitch accent label.

4. The method of claim 1, wherein the discriminative classifier model determines which segments of the speech are prosodically prominent.

5. The method of claim 1, wherein the pitch accent label comprises an indication of certainty that a respective segment of the speech is prosodically prominent.

6. The method of claim 1, wherein the pitch accent label comprises an indication of prosodic prominence of a respective segment of speech.

7. A system comprising:
a processor; and
a computer-readable medium having instructions stored which, when executed by the processor, cause the processor to perform operations comprising:
receiving speech for translation to a target language;
prior to a translation of the speech, generating, via the processor and via a discriminative classifier model, a pitch accent label based on the speech independent of volume, the pitch accent label having a regional accent type and representing segments of the speech which are prosodically prominent; and
injecting the pitch accent label with a word token within a translation engine to create target language output text.

8. The system of claim 7, the computer-readable medium having additional instructions stored which result in the operations further comprising synthesizing speech in the target language based on the target language output text.

9. The system of claim 7, wherein an automatic prosody labeler generates the pitch accent label.

10. The system of claim 7, wherein the discriminative classifier model determines which segments of the speech are prosodically prominent.

11. The system of claim 7, wherein of the pitch accent label comprises an indication of certainty that a respective segment of the speech is prosodically prominent.

12. The system of claim 7, wherein the pitch accent label comprises an indication of prosodic prominence of a respective segment of speech.

13. A computer-readable storage device having instructions stored which, when executed by a processor, cause the processor to perform operations comprising:
receiving speech for translation to a target language;
prior to a translation of the speech, generating, via the processor and via a discriminative classifier model, a pitch accent label based on the speech independent of volume, the pitch accent label having a regional accent type and representing segments of the speech which are prosodically prominent; and
injecting the pitch accent label with a word token within a translation engine to create target language output text.

14. The computer-readable storage device of claim 13, the computer-readable storage device having additional instructions stored which result in the operations further comprising synthesizing speech in the target language based on the enriched target language output text.

15. The computer-readable storage device of claim 13, wherein an automatic prosody labeler generates the pitch accent label.

16. The computer-readable storage device of claim 13, wherein the discriminative classifier model determines which segments of the speech are prosodically prominent.

17. The computer-readable storage device of claim 13, wherein the pitch accent label comprises an indication of certainty that a respective segment of the speech is prosodically prominent.

* * * * *